US012723613B2

(12) United States Patent
Holma

(10) Patent No.: US 12,723,613 B2
(45) Date of Patent: Sep. 1, 2026

(54) CORNER BRACKET FOR CONNECTING A LEG WITH A FIRST FURNITURE PART, AND A SECOND FURNITURE PART, BEDFRAME, AND METHOD THEREFOR

(71) Applicant: Inter IKEA Systems B.V., Ln Delft (NL)

(72) Inventor: Thomas Holma, Svaengsta (SE)

(73) Assignee: Inter IKEA Systems B.V. (NL)

( * ) Notice: Subject to any disclaimer, the term of this patent is extended or adjusted under 35 U.S.C. 154(b) by 13 days.

(21) Appl. No.: 18/727,685

(22) PCT Filed: Jan. 4, 2023

(86) PCT No.: PCT/SE2023/050005
§ 371 (c)(1),
(2) Date: Jul. 9, 2024

(87) PCT Pub. No.: WO2023/132777
PCT Pub. Date: Jul. 13, 2023

(65) Prior Publication Data

US 2025/0223988 A1 Jul. 10, 2025

(30) Foreign Application Priority Data

Jan. 10, 2022 (SE) .................................... 2250008-6

(51) Int. Cl.
*F16B 12/56* (2006.01)
*A47C 19/02* (2006.01)
*F16B 12/14* (2006.01)

(52) U.S. Cl.
CPC ............ *F16B 12/56* (2013.01); *A47C 19/024* (2013.01); *F16B 2012/145* (2013.01)

(58) Field of Classification Search
CPC ..... A47C 19/024; A47C 19/005; A47C 19/02; F16B 2012/145; F16B 12/20; F16B 12/56; F16B 12/54; F16B 12/60
See application file for complete search history.

(56) References Cited

U.S. PATENT DOCUMENTS 1,936,733 A * 11/1933 Richardson .......... A47B 88/941 217/65
2,970,025 A * 1/1961 Wilson .................... F16B 12/48 403/219

(Continued)

FOREIGN PATENT DOCUMENTS

CN 102472049 A * 5/2012 .............. F16B 12/20
DE 10116857 C1 * 9/2002 ........... A47C 19/024

(Continued)

OTHER PUBLICATIONS

English abstract for FR2458701.

*Primary Examiner* — Matthew Troutman
*Assistant Examiner* — Alison N Labarge
(74) *Attorney, Agent, or Firm* — Fishman Stewart PLLC

(57) ABSTRACT

A corner bracket for connecting a leg with a first furniture part and a second furniture part of a piece of furniture is disclosed. The corner bracket includes an upper part and a lower part. The upper part includes a first side portion and a second side portion each having an integrally formed engaging member with an end section configured to engage an internal side of the first furniture part or the second furniture part, respectively. The upper part includes a securing member configured to receive a fastening member of the leg. The lower part includes a through opening configured to be aligned with the securing member and to receive the fastening member of the leg. In use the end section of each (Continued)

engaging member extends at least to some extent downwards towards the respective internal side of the first and second furniture parts.

20 Claims, 7 Drawing Sheets

(56) References Cited

U.S. PATENT DOCUMENTS

| | | | | |
|---|---|---|---|---|
| 4,068,967 | A | 1/1978 | Hoodis | |
| 7,155,782 | B2 * | 1/2007 | Napurano | A44B 1/04 24/114.9 |
| 2004/0199997 | A1 | 10/2004 | Harrow | |
| 2008/0078022 | A1 * | 4/2008 | Wecker | A47C 19/025 5/310 |
| 2021/0227985 | A1 * | 7/2021 | Thompson | A47C 19/021 |

FOREIGN PATENT DOCUMENTS

| | | | | |
|---|---|---|---|---|
| FR | 2458701 | A1 | 1/1981 | |
| GB | 2089881 | A | 6/1982 | |
| GB | 2133855 | A | 8/1984 | |
| WO | WO-2020071982 | A1 * | 4/2020 | F16B 12/54 |

* cited by examiner

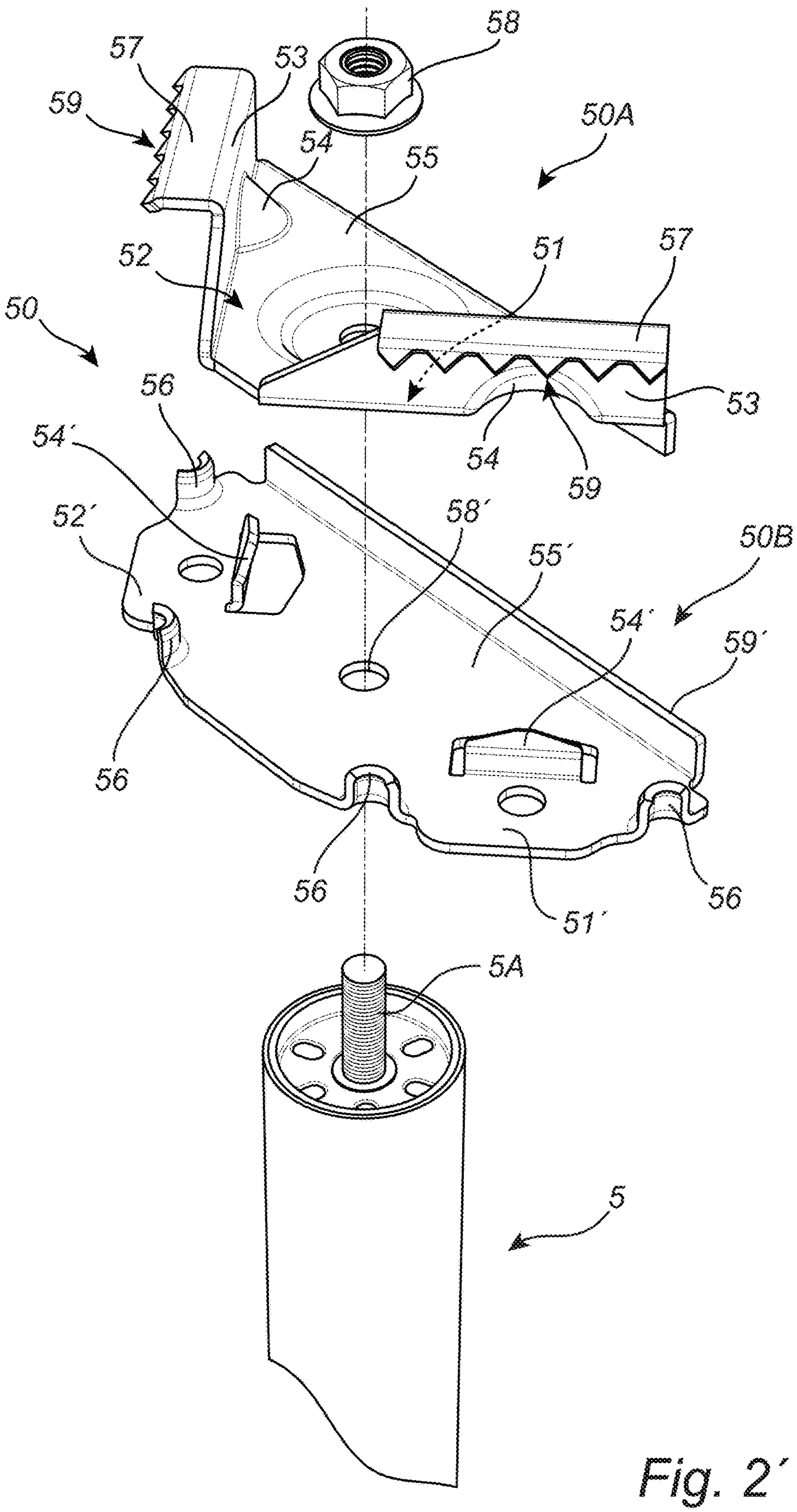
Fig. 2´

CORNER BRACKET FOR CONNECTING A LEG WITH A FIRST FURNITURE PART, AND A SECOND FURNITURE PART, BEDFRAME, AND METHOD THEREFOR

CROSS-REFERENCE TO RELATED APPLICATIONS

This application claims priority to International Patent Application No. PCT/SE2023/050005 filed Jan. 4, 2023, which also claims priority to Swedish Patent Application SE 2250008-6 filed Jan. 10, 2022, the contents of each of which is hereby incorporated by reference in its entirety.

TECHNICAL FIELD

The present invention relates to a corner bracket for a piece of furniture. Further, the invention relates to a method for connecting a leg with a first furniture part, and a second furniture part of a piece of furniture using said cornet bracket.

BACKGROUND

A bed typically comprises a mattress held in a bedframe typically comprising two long side furniture parts and two short side furniture parts that are connected to each other by corner brackets. The corner bracket may also connect the side furniture parts to legs of the bedframe.

However, corner brackets known in the art suffer from several drawbacks. Firstly, they depend on the height of the side furniture parts and cannot be used together with side furniture parts of variable height. Secondly, several fastening means, such as screws, are required to attach the corner bracket to the side furniture parts, causing an undue burden for the user upon assembling of the bedframe.

An exemplary corner bracket is disclosed in the patent application WO2020/071982A1. Even though the cornet bracket in this patent application solves the issues of having a relatively large number of separate elements that have to be connected with each other and can only be connected by usage of different tools, the problems described above still prevail.

Further prior art is disclosed in US2021227985A1, where a frame comprises two end trusses, and two side trusses. Each truss is secured to another with a connector assembly and a stabilizer assembly. The connector assembly has a connector block attached to one end truss and a connector block attached a side truss. Each connector block has three fingers with an opening there through. A pin extends through the opening when the fingers are aligned. The stabilizer assembly has a top corner leg bracket and a bottom corner leg bracket secured together with a leg assembly. First and second walls extend upwardly from a planar base of the corner leg bracket. Once assembled, tabs of the top corner leg bracket and the walls cooperate to surround and secure a lower member of the trusses.

However, this solution depends on both a connector assembly and a stabilizer assembly. Further, the assembly requires alignment of the fingers of the connector block which is cumbersome for a single user.

Hence, there is a need for an improved corner bracket for a piece of furniture mitigating the above issues.

SUMMARY

The present invention seeks to mitigate, alleviate, eliminate or circumvent one or more of the above identified deficiencies in the art and disadvantages singly or in any combination by providing in a first aspect a corner bracket for connecting a leg with a first furniture part, and a second furniture part of a piece of furniture. The corner bracket comprises an upper part and a lower part. The upper part comprises a first side portion and a second side portion each having an integrally formed engaging member with an end section configured to engage an internal side the first furniture part or the second furniture part, respectively. Further, the upper part comprises a securing means configured to receive a fastening means of the leg. The lower part comprises a through opening configured to be aligned with the securing means and to receive the fastening means of the leg. In use the end section of each engaging member extends at least to some extent downwards towards the respective internal side of the first and second furniture parts.

This corner bracket is beneficial since it is easy to assemble and manufacture, and is invisible from an exterior of the piece of furniture. Moreover, the corner bracket can be used with a wide range of furniture parts since the corner bracket is not dependent on the height of the furniture parts to connect the corner bracket to the piece of furniture and the leg.

In one embodiment, the engaging members are substantially L-shaped, extending vertically and horizontally from an upper surface of the upper part of the corner bracket. The end section is extending at least to some extent vertically downwards from the horizontal section of the L-shape.

In a second embodiment, the end section of the engaging members each engages an internal edge profile of the internal sides of the first and second furniture parts.

The internal edge profile may be arranged along an internal bottom edge of the first or second furniture part.

In another embodiment, the end section of the engaging member forms a toothed end configured to engage the edge profile. The toothed end may be arranged on a tilted end of a horizontally extending portion of the L-shaped engaging member.

In yet a further embodiment, the toothed end is angled towards an upper surface of the upper part.

The toothed end may be configured to engage an upper side of an internal edge profile of the first or second furniture part.

In one embodiment, the lower part comprises a first side portion and a second side portion, each comprising at least one protrusion configured to be mated with a corresponding aperture arranged in the first and second furniture parts.

The at least one protrusion may extend vertically from an upper surface of the lower part and the corresponding aperture may extend into a bottom surface of the first and/or second furniture parts, respectively.

In another embodiment, the fastening means is a threaded screw and the securing means is a threaded bore configured to be engaged with the fastening means to secure the upper part and the lower part together.

In a further embodiment, the piece of furniture is a bedframe or a sofa frame.

In yet another embodiment, the corner bracket is made of a metal, preferably steel.

In a second aspect, there is provided a bedframe comprising a corner bracket for connecting a leg with a first furniture part, and a second furniture part of the bedframe. The corner bracket being the corner bracket as described above.

In a third aspect, there is provided a method for connecting a leg with a first furniture part, and a second furniture part of a piece of furniture, using the cornet bracket. The method comprises contacting an end section of an integrally formed engaging member provided on a first side portion of an upper part of the corner bracket with an internal side of the first furniture part, and contacting an end section of an integrally formed engaging member provided on a second side portion of an upper part of the corner bracket with an internal side of the second furniture part such that each engaging member extends at least to some extent downwards towards the respective internal side of the first and second furniture parts. The method then comprises aligning a lower part of the corner bracket with the upper part such that a through opening in the lower part is aligned with a securing means of the upper part. Finally, the method comprises inserting a fastening means of the leg through the through opening and into the securing means and engaging the fastening means with the securing means.

In one embodiment, the method further comprises engaging a toothed end section forming a tilted end of an horizontally extending portion of the engaging member with an upper side of an internal edge profile of the internal side.

In a further embodiment, the step of inserting and engaging the fastening means further comprises mating at least one protrusion arranged on the lower part with at least one corresponding aperture extending into a bottom surface of the first or second furniture part, respectively.

Further advantageous features of the invention are elaborated in embodiments disclosed herein. In addition, advantageous features of the invention are defined in the dependent claims.

BRIEF DESCRIPTION OF THE DRAWINGS

These and other aspects, features and advantages of which the invention is capable of will be apparent and elucidated from the following description of embodiments of the present invention, reference being made to the accompanying drawings, in which:

FIG. 2' is an exploded view of a corner bracket according to another embodiment of the present invention;

DETAILED DESCRIPTION

Hereinafter, certain embodiments will be described more fully with reference to the accompanying drawings. The invention may, however, be embodied in many different forms and should not be construed as limited to the embodiments set forth herein. Rather, these embodiments are provided by way of example so that this disclosure will be thorough and complete, and will fully convey the scope of the invention, such as it is defined in the appended claims, to those skilled in the art.

Figure 1:
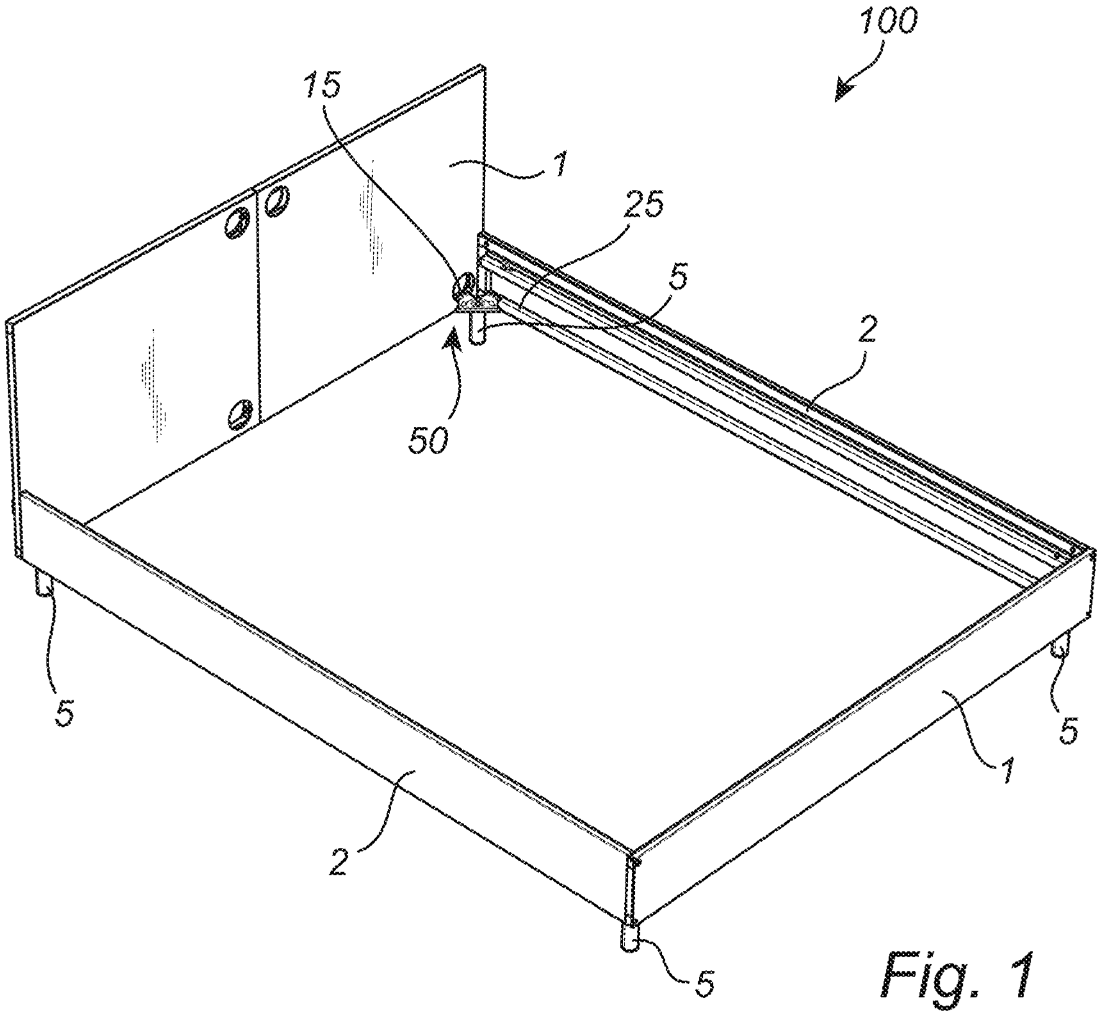
FIG. 1 depicts a bedframe comprising a corner bracket according to the present invention.

With reference to FIG. 1, a piece of furniture 100 in the form of a bedframe is shown. In other embodiments, the piece of furniture 100 may be for instance a frame for a sofa, a sofa bed, a table, or a chair.

In FIG. 1, the bedframe 100 has a head end and a foot end, each forming a first furniture part 1. The head end in FIG. 1 is a headboard, but may also be a head end identical or similar to the foot end shown in FIG. 1. Further, the bedframe 100 comprises two parallel side ends, each forming a second furniture part 2.

Each corner of the bedframe 100 is provided with a leg 5 connected to the first furniture part 1 and the second furniture part 2 through a corner bracket 50. The only corner bracket 50 shown in FIG. 1 engages an aperture 15 of the first furniture part 1 and an edge profile 25 of the second furniture part 2. Since the corner bracket 50 engages an internal side 11, 21 of each one of the first and second furniture parts 1, 2, the corner bracket 50 is not visible from the exterior of the piece of furniture 100. Alternatively, the corner bracket 50 engages an edge profile 15, 25 of the first and second furniture parts 1, 2, respectively (shown in FIGS. 3-5). The corner bracket 50 will be described further with reference to FIGS. 2-6.

Figure 2:
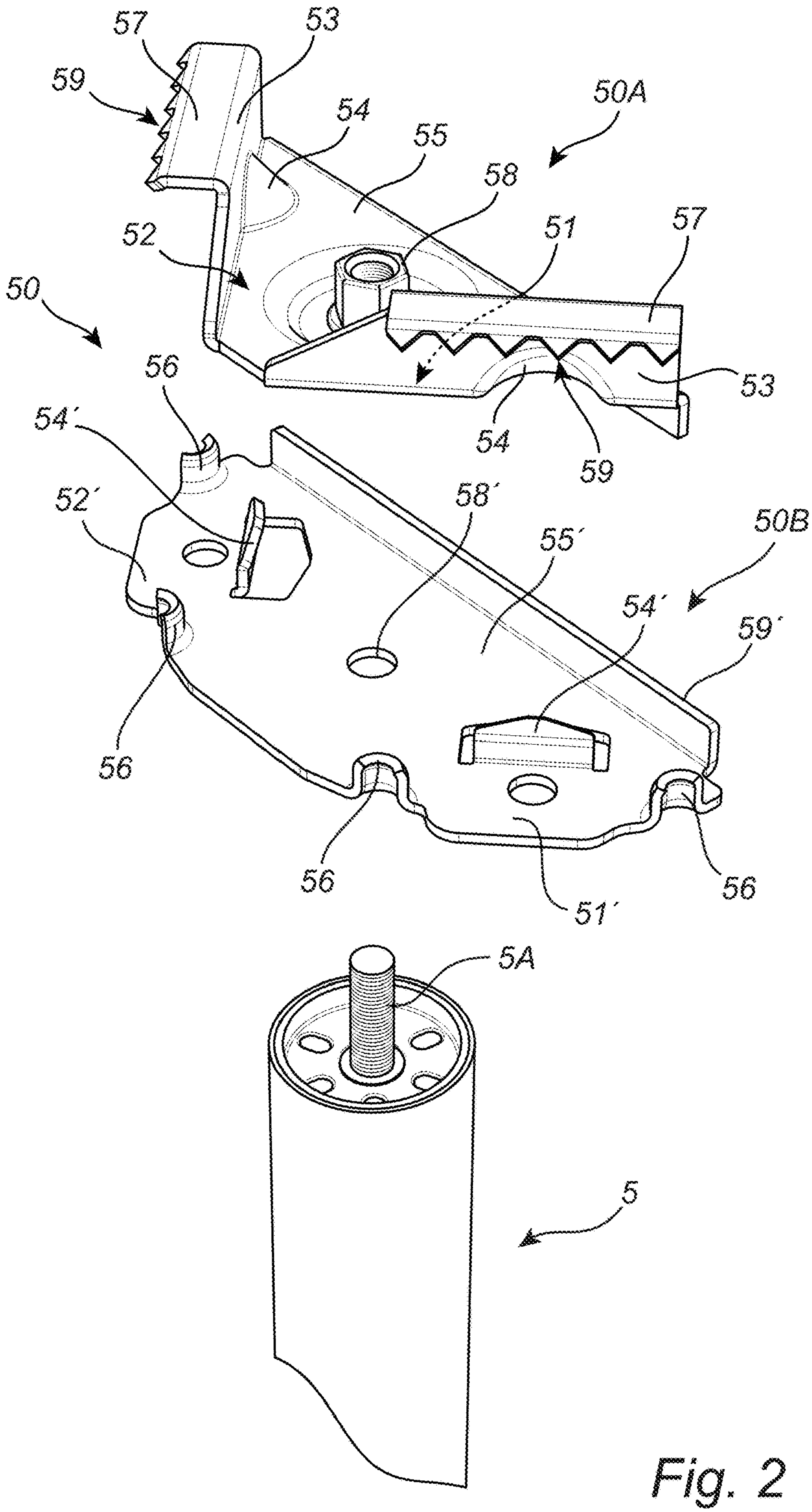
FIG. 2 is an exploded view of the corner bracket according to the present invention.

FIG. 2 shows an isometric exploded view of the corner bracket 50 and the leg 5. The corner bracket 50 comprises an upper part 50A and a lower part 50B. The leg 5 is provided with a fastening means 6, in FIG. 2 being in the form of a threaded screw, arranged on an upper end of the leg 5. The leg 5 is cylindrical but may have any other geometrical shape, such as being a rectangular parallelepiped.

The upper part 50A shown in FIG. 2 comprises an upper surface 55, a first side portion 51, and a second side portion 52. Each side portion 51, 52 comprises an integrally formed engaging member 53 configured to engage the first or second furniture part 1, 2, respectively. Further, the upper part 50A comprises a securing means 58. In FIG. 2, the securing means 58 is a threaded bore 58, also referred to as a hollow and threaded nut 58, extending vertically from the upper surface 55.

Alternatively, as shown in FIG. 2', the upper part 50A comprises a securing means 58 in the form of a separate nut or bolt. Such a securing means 58 is releasably engagable with the fastening means 6 of the leg 5. Hence, the securing means 58 may be pre-mounted or attached to the upper part 50A or be a separate securing means 58, e.g. in the form of a threaded nut, bolt or cap configured to engage the fastening means 6. A loose securing means 58, e.g. in the form of a nut, may be attached to the fastening means 6 of the leg 5 using a tool, such as a wrench, which provides the user with leverage to facilitate the attachment. The remaining features of the corner bracket 50 and the leg 5 shown in FIG. 2' are the same as the features shown with reference to FIG. 2.

The upper part 50A further comprises a cavity or bulge 54 formed along each side portion 51, 52. The cavity 54 is arranged in a bottom surface of the upper part 50A forming a bulge 54 extending vertically from the upper surface 55. Further, each engaging member 53 of the upper part 50A is substantially L-shaped, extending vertically and horizontally from the upper surface 55. Hence, each engaging member 53 has a portion extending upwards from the upper surface 55 and a further portion 57 extending horizontally, laterally away from the nut 58. The portion 57 has an end section 59 angled downwards, i.e. towards a plane of the upper surface 55. In other words, the tilted end of the laterally extending portion 57 is angled downwards the plane of the upper surface 55. The portion extending upwards from the upper surface 55 has a first side facing the upper surface and a second side opposite the first side facing away from the upper surface 55. Hence, the end section 59 is angled downward in the same direction as the second side facing away from the upper surface 55, i.e. in a direction opposite of the upper surface 55.

FIG. 2 further shows that the engaging members 53 each comprises a toothed end 59 arranged on each laterally extending portion 57 of the L-shaped engaging member 53. Hence, the toothed end 59 is arranged on an end of a horizontally extending portion 57 of the engaging member 53. In an assembled state (shown in FIGS. 3-5) the laterally extending portion 57 projects away from the securing means 58 and towards the internal sides 11, 21 of the first and second furniture parts 1, 2.

The upper part 50A further comprises a rim 55A that extends along one side of the upper surface 55 not being provided with any engaging member 53. The upper surface 55 is preferably in the shape of a triangle, optionally truncated, wherein the rim 55A extends along one entire side of the triangular shaped upper surface 55. The rim 55A extends in a direction perpendicular to the horizontal extension of the upper surface 55, in a direction downwards towards the lower part 50B. The rim 55A will assist in guiding the upper part 50A into its correct position relative the lower part 50B, and also increase the rigidity of the upper part 50A. Especially, the rim 55A will prevent bending of the upper part 50A when the leg is tightened.

The lower part 50B of the corner bracket 50 is also shown in FIG. 2. The lower part 50B has an upper surface 55' provided with an aperture 58' configured to be aligned with the securing means 58 of the upper part 50A and to receive the fastening means 6. Optionally, the securing means 58 and the fastening means 6 may form a bayonet coupling (not shown).

Further, the lower part 50B has a first side portion 51' and a second side portion 52', each provided with two protrusions 56 extending vertically from the upper surface 55'. The lower part 50B may comprise fewer or more protrusions 56, such as one, three or four protrusions on each first and second side portions 51', 52', respectively.

Figure 3:
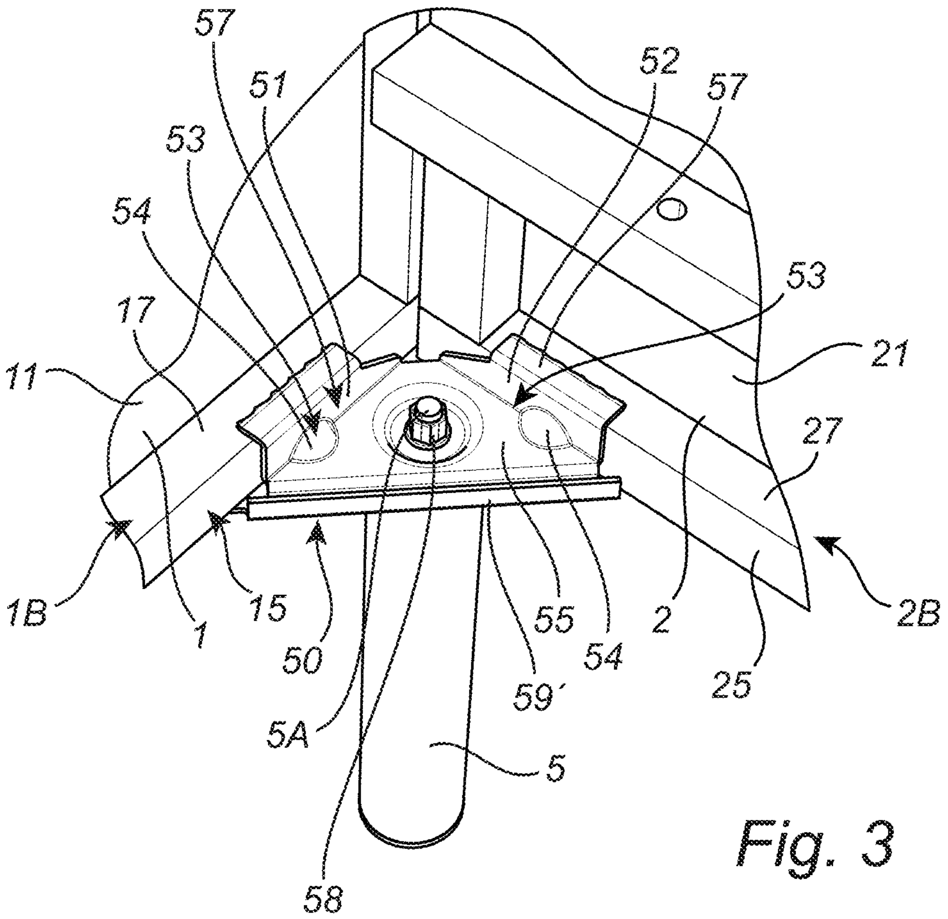
FIG. 3 is an isometric view of the corner bracket according to the present invention attached to a first and second furniture part seen from above.

The lower part 50B further comprises an outer rim 59' configured to cover an outer edge of the upper part 50A (as shown in FIG. 3). The outer rim 59' will assist in guiding the upper part 50A into its correct position relative the lower part 50B, and also increase the rigidity of the lower part 50B. Especially, the outer rim 59' will prevent bending of the lower part 50B when the leg is tightened. In case the leg is tightened too much there will only be a small gap between the bottom side of the rim 55A of the upper part 50A and the upper surface of the lower part 50B which will prevent the lower part 50B from deforming to an unacceptable amount.

Finally, the first side portion 51' and the second side portion 52' of the lower part 50B each comprises a vertically extending projection 54', each configured to mate and fit within the cavity 54 arranged on the upper part 50A.

Preferably, the upper part 50A and the lower part 50B of the corner bracket 50 are formed from a metal, such as a sheet metal. The metal may be for instance steel or galvanized steel. Each one of the upper part 50A and the lower part 50B are formed in one piece from one piece of material, preferably a metal, which makes the corner bracket 50 easy and inexpensive to manufacture.

Figure 4:
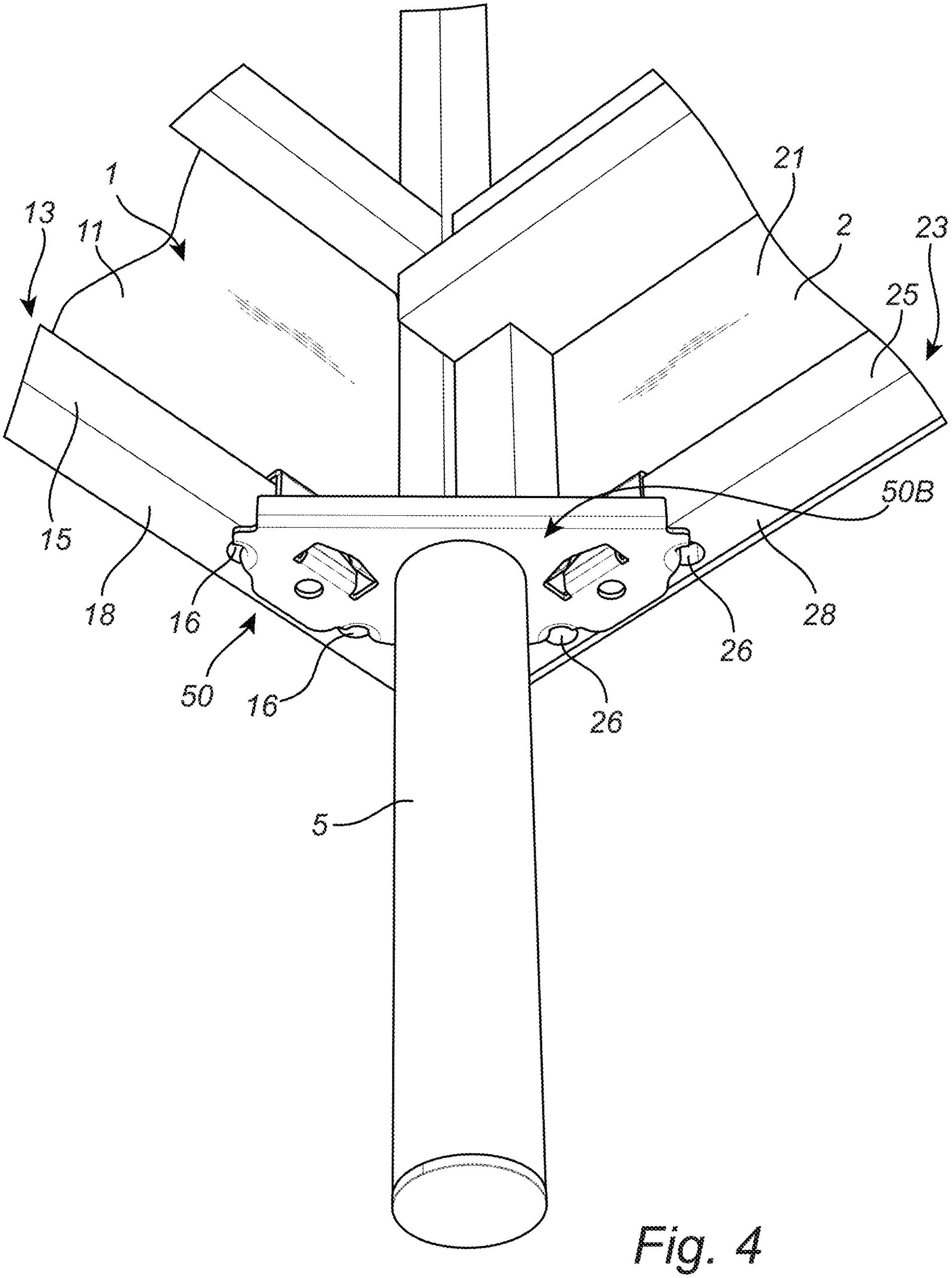
FIG. 4 is an isometric view of the corner bracket according to the present invention attached to a first and second furniture part seen from below.

FIGS. 3 and 4 show isometric views of said corner bracket 50 seen from above (FIG. 3) and from below (FIG. 4) while connected to the internal sides 11, 21 of the first furniture part 1 and the second furniture part 2, respectively.

As shown in FIG. 3, and as described with reference to FIG. 2, the upper part 50A of the corner bracket 50 comprises the upper surface 55, the first side portion 51, and the second side portion 52. The leg 5 shown in FIG. 3 comprises the fastening means 6 in the form of a threaded screw, which is mated with and secured to the threaded nut 58 of the upper part 50A. The fastening means 6 is also inserted through the through hole 58' of the lower part 50B, however, this is not visible in FIG. 3.

The corner bracket 50 as seen from above has a substantially triangular shape, configured to fit in a perpendicularly angled corner between the first and second furniture parts 1, 2. However, the corner bracket 50 may be designed to fit a corner having an angle being smaller or larger than 90 degrees.

FIG. 3 shows that the first furniture part 1 and the second furniture part 2 each comprises the internal surface 11, 21, each having an internal bottom edge 13, 23. The internal bottom edge 13, 23 in turn comprises an internal edge profile 15, 25. The internal edge profiles 15, 25 each comprises an upper side 17, 27.

The engaging members 53 shown in FIG. 3 each engages the respective internal edge profile 15, 25 of the first and second furniture parts 1, 2. Said internal edge profiles 15, 25 are arranged along the internal bottom edge 13, 23 of the first and second furniture parts 1, 2. The horizontally extending portion 57 of each one of the L-shaped engaging members 53 abuts the upper side 17, 27 of the internal edge profile 15, 25. Hence, the end section 59 of the upper member 50A is angled downwards towards the upper side 17, 27 of the internal edge profile 15, 25. Preferably, the end section 59 of the engaging members 53 each engages the upper side 17, 27 of the internal edge profile 15, 25 of the internal sides 11, 21.

Turning to FIG. 4, the corner bracket 50 is seen from below in an assembled state. Each protrusion 56 is mated with a corresponding aperture 16, 26 arranged in the first or second furniture part 1, 2, respectively. The apertures 16, 26 extend into a bottom surface 18, 28 of the first or second furniture parts 1, 2. The outer rim 59' covers the outer edge of the upper part 50A.

Figure 5:
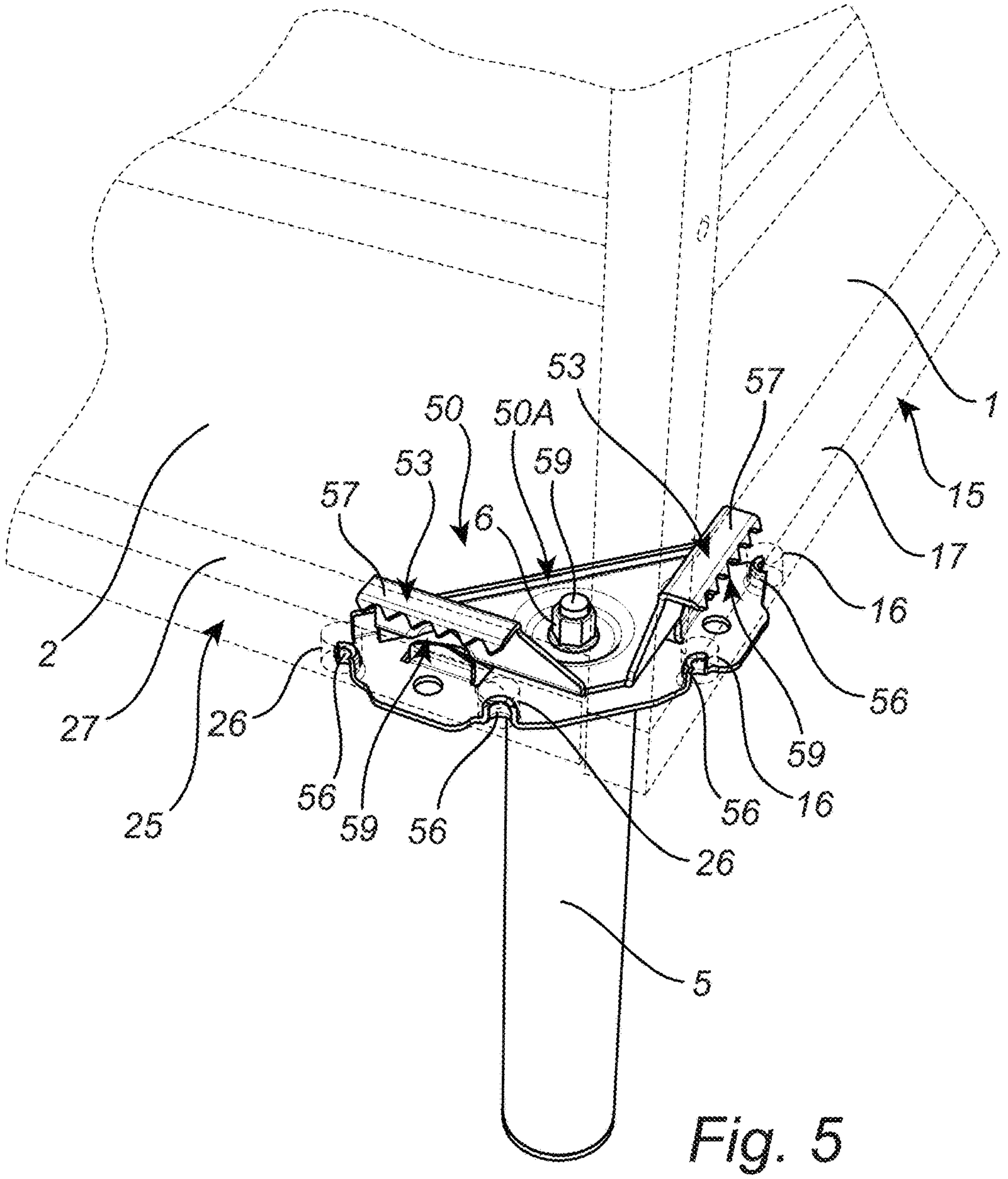
FIG. 5 is an isometric view of the corner bracket according to the present invention attached to a first and second furniture part.

FIG. 5 is an isometric view of the corner bracket 50 being attached to the leg 5 and the furniture parts 1, 2, viewed from the outside of the furniture parts 1, 2. Hence, the furniture parts 1, 2 are drawn with dashed lines. As also shown in FIG. 4, the four protrusions 56 are fitted into a corresponding aperture 16, 26 arranged in the first or second furniture part 1, 2, respectively. The apertures 16, 26 extend into the bottom surface 18, 28 of the first or second furniture parts 1, 2. The engaging members 53 each abuts one of the internal edge profiles 15, 25. More specifically, each horizontally extending portion 57 of the L-shaped engaging members 53 abuts the upper side 17, 27 of the internal edge profile 15, 25, and the vertically extending portions of the engaging members 53 abut an internally facing surface of the internal edge profiles 15, 25. At the same time, the fastening means 6 has been connected to the nut 58 of the upper part 50A.

Figure 6:
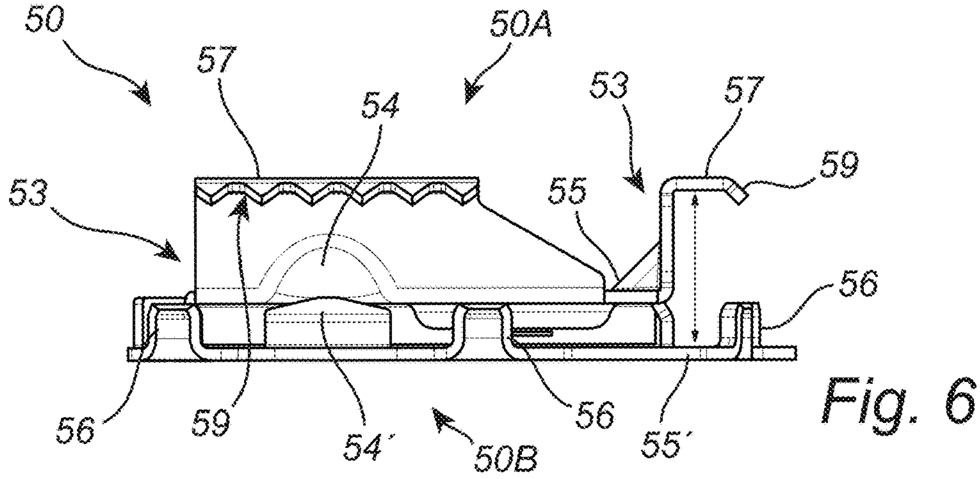
FIG. 6 is a side view of the corner bracket according to the present invention.
Figure 7:
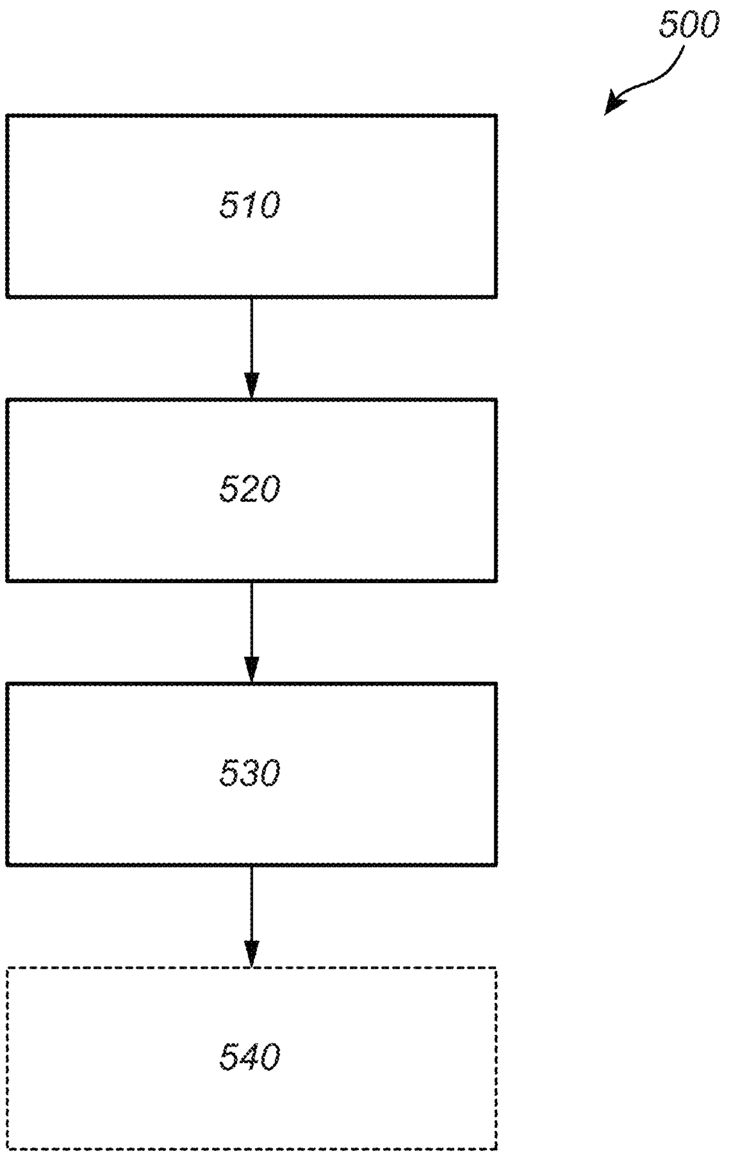
FIG. 7 is a flow chart of a method for connecting a leg with a piece of furniture using the corner bracket according to the present invention.

FIG. 6 shows a side view of the corner bracket 50. The upper part 50A and the lower part 50B have been aligned and fitted with each other. The engaging members 53 extend from the upper surface 55 of the upper part 50A. The horizontally extending end 57 is best shown to the right in FIG. 6. The L-shape of the engaging member 53 is also clearly shown in the right most engaging member 53 in FIG. 6.

The outer end of the end 57 comprises the toothed end 59. As shown in FIG. 6, the toothed end 59 is angled towards the upper surface 55 of the upper part 50A. This enhances the engagement of the upper part 50A with the internal edge profile 15, 25. When the fastening means 6 is connected through the through opening 58' and to the nut 58, the upper part 50A and the lower part 50B are forced towards each other. Once the toothed end 59 comes into contact with the upper surface 17, 27 of the internal edge profile 15, 25, a continued rotation of the leg 5 forces the teeth of the toothed end 59 into the internal edge profile 15, 25. The toothed end 59 shown in FIG. 6 comprises six individual teeth. However, the toothed end 59 may comprise fewer or more teeth.

As the teeth of the toothed end 59 are directed at least to some extent downwards, the engagement by the teeth will assist in pulling the upper part 50A towards the profiles 15, 25 thus creating a stronger and more robust connection. It should be noted that the teeth may in some embodiments be directed entirely vertically downwards, or at any angle as long as they are at least to some extent directed downwards.

Optionally, the end 59 is simply angled as shown in FIG. 6 without any teeth (not shown). In such case, the horizontally extending end 57 has an angled outer end pivoted towards the upper surface 55 of the upper part 50A. Said angled outer end is configured to engage the upper surface 17, 27 of the internal edge profile 15, 25.

Further, a height H between the upper surface 55' of the lower part 50B and the horizontally extending end 57 of the engaging member 53 corresponds to a height of the internal edge profiles 15, 25 of the first and second furniture parts 1, 2.

The protrusions 56 of the lower part 50B facilitates the alignment of the lower part 50B with the upper part 50A when they are fitted with the apertures 16, 26 in the bottom surface 18, 28 of the first and second furniture parts 1, 2 (shown in FIG. 4). Each cavity 54 and the corresponding projection 54' further facilitates said alignment, and the projection 54' further serves as a support structure for the internal edge profiles 15, 25.

With reference to FIGS. 1 to 7, a method 500 for connecting the leg 5 with the first furniture part 1, and the second furniture part 2 of a piece of furniture 100 with the corner bracket 50 will now be described in more detail.

In short, the method 500 comprises contacting 510 the integrally formed engaging member 53 provided on the first side portion 51 of the upper part 50A with an internal side 11 of the first furniture part 1 and contacting the integrally formed engaging member 53 provided on the second side portion 52 of the upper part with the internal side 21 of the second furniture part 2. Then, the method 500 comprises aligning 520 the lower part 50B of the corner bracket 50 with the upper part 50B such that the through opening 58' in the lower part 50B is aligned with the securing means 58 of the upper part 50A. Finally, the method 500 comprises inserting 530 the fastening means 6 of the leg 5 through the through opening 58' and into the securing means 58 and engaging the fastening means 6 with the securing means 58. It should be mentioned that the securing means 58 of the upper part 58 may in some embodiments be realized as a loose nut, which is tightened on the threaded screw 6 of the leg 5.

Optionally, the method 500 further comprises engaging 540 the toothed end 59 of the horizontally extending portion 57 of the engaging member 53 with the upper side 17, 27 of the internal edge profile 15, 25. Further optionally, the step of inserting and engaging 530 the fastening means 6 may further comprise mating at least one protrusion 56 arranged on the lower part 50B with at least one corresponding aperture 16, 26 extending into the bottom surface 18, 28 of the first or second furniture part 1, 2, respectively.

The method 500 will now be described in more detail. A user starts off by placing the upper part 50A of the corner bracket 50 in a corner between the first furniture part 1 and the second furniture part 2. Preferably the first furniture part 1 and the second furniture part 2 have already been connected together by a separate fastening means, such as a dowel, plug, bolt, nail or screw.

Each engaging member 53 of the upper part 50A is brought into contact with the internal side 11, 21 the first furniture part 1 or the second furniture part 2, respectively. More specifically, the toothed ends 59 are arranged in contact with the upper surface 17, 27 of the internal edge profiles 15, 25 of the first and second furniture parts 1, 2.

Then, the user arranges the lower part 50B below the upper part 50A, aligning the through opening 58' with the nut 58, and fitting the protrusions 56 in the apertures 16, 26 of the first and second furniture parts 1, 2.

Finally, to secure the upper and lower parts 50A, 50B to each other, the user inserts the fastening means 6, such as a screw 6, through the through opening 58' and into the hollow threaded nut 58. The user simply rotates the leg 5 clockwise to engage the screw 6 with the threads of the hollow nut 58. Upon engagement of the fastening means 6 with the threaded nut 58, the lower part 50B and the upper part 50A of the corner bracket 50 are secured to each other, the first furniture part 1, the second furniture part 2 and the leg 5.

When the user rotates the leg 5, the toothed ends 59 of the engaging members 53 will be forced into the material of the internal edge profiles 15, 25. Thus, the teeth of the toothed ends 59 will engage the upper surface 17, 27 of the internal edge profiles 15, 25. The teeth will penetrate into the upper surfaces 17, 27 until the horizontally extending end 57 of the engaging members 53 comes into contact with the upper surface 17, 27. With reference to an optional embodiment, the leg 5 may be held stationary and a loose nut forming the securing means 58 may instead be rotated.

In an assembled state in which the leg 5 is completely fastened to the corner bracket 50, i.e., after completion of the screwing operation described above, the leg 5 abuts the lower part 50B, the lower part 50B abuts the bottom surfaces 18, 28 of the first furniture panel 1 and the second furniture panel 2, and the upper part 50A abuts both the upper surface 17, 27 and a side edge of the internal edge profile 15, 25 of the internal surfaces 11, 21 of the first furniture panel 1 and the second furniture panel 2.

Thus, there is no need for the user to use any tools or other mechanical equipment to connect the corner bracket 50 to the first and second furniture parts 1, 2. Furthermore, the assembling process is quick and simple, and can be conducted by a single person. Moreover, the corner bracket 50 of the present invention can be used together with furniture parts 1, 2 such as side ends and head or foot ends of a bedframe having variable height, as long as the internal edge profiles 15, 25 have a height corresponding to the height of the L-shaped engaging member 53. Thus, the corner bracket 50 can be used together with different bedframes or other pieces of furniture 100 having internal edge profiles matching the height of the engaging members 53.

Further, by securing the legs 5 in interlocking engagement with the adjacent furniture panels 1, 2 through the corner bracket 50 a stable base of a piece of furniture 100 can be achieved. Since the furniture panels 1, 2 are connected to each other by a separate fastening means as described above, the corner bracket 50 provides additional support, such that distortions of the assembled configuration of the piece of furniture 100 due to relative movement of the furniture panels 1, 2 when being handled and supporting loads in use can be prevented. Without further elaboration, it is believed that one skilled in the art may, using the preceding description, utilize the present invention to its fullest extent. The preceding preferred specific embodiments are, therefore, to be construed as merely illustrative and not limitative of the disclosure in any way whatsoever.

Although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different than those described above.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an", "first", "second" etc. do not preclude a plurality.

The invention claimed is:

1. A corner bracket for connecting a leg with a first furniture part, and a second furniture part of a piece of furniture, said corner bracket comprising: an upper part and a lower part, wherein the upper part comprises:

a first side portion and a second side portion each having an integrally formed engaging member with an end section configured to engage an internal side of the first furniture part or the second furniture part, respectively; and a securing member configured to receive a fastening member of the leg;

wherein the lower part comprises:

a through opening configured to be aligned with the securing member and to receive the fastening member of the leg, wherein in use the end section of each engaging member extends at least to some extent downwards towards the respective internal side of the first and second furniture parts, and wherein in use the end section of the engaging members each engage an upper side of an internal edge profile of the internal sides of the first and second furniture parts;

wherein the upper part comprises a cavity disposed along each of the first side portion and the second side portion, each cavity is arranged in a bottom surface of the upper part at the engagement member of the first side portion and the second side portion; and wherein the lower part further includes a first side portion and a second side portion, the first side portion and the second side portion of the lower part each including a vertically extending projection, each vertically extending projection configured to fit within a corresponding one of each cavity of the upper part.

2. The corner bracket according to claim 1, wherein the engaging members are substantially L-shaped, extending vertically and horizontally from an upper surface of the upper part of the corner bracket, and wherein the end section is extending at least to some extent vertically downwards from the horizontal section of the L-shape.

3. The corner bracket according to claim 1, wherein the upper part further includes a rim that extends along an outer side of an upper surface that is provided without any engaging members, and wherein the rim extends downwards towards the lower part.

4. The corner bracket according to claim 1, wherein the internal edge profile is arranged along an internal bottom edge of the first and second furniture parts.

5. The corner bracket according to claim 1, wherein the end section of the engaging member forms a toothed end configured to engage the upper side of the internal edge profile.

6. The corner bracket according to claim 5, wherein the toothed end is arranged on a tilted end of a horizontally extending portion of the engaging member.

7. The corner bracket according to claim 5, wherein the toothed end is angled towards an upper surface of the upper part.

8. The corner bracket according to claim 1, wherein:

the cavity respectively forms a bulge extending vertically from an upper surface of the upper part.

9. The corner bracket according to claim 1, wherein the first side portion and the second side portion of the lower part each comprise at least one protrusion configured to be mated with a corresponding aperture arranged in the first and second furniture parts.

10. The corner bracket according to claim 9, wherein said at least one protrusion extends vertically from an upper surface of the lower part and the corresponding aperture extends into the bottom surface of the first and/or second furniture parts, respectively.

11. The corner bracket according to claim 1, wherein the fastening member is a threaded screw and the securing member is a threaded bore configured to be engaged with the fastening member to secure the upper part and the lower part together.

12. The corner bracket according to claim 1, wherein the piece of furniture is a bedframe or a sofa frame.

13. The corner bracket according to claim 1, wherein the corner bracket is made of a metal.

14. A bedframe, comprising: a corner bracket for connecting a leg with a first furniture part, and a second furniture part of the bedframe, said corner bracket including an upper part and a lower part;

wherein the upper part comprises:

a first side portion and a second side portion each having an integrally formed engaging member with an end section configured to engage an internal side of the first furniture part or the second furniture part, respectively; and a securing member configured to receive a fastening member of the leg;

wherein the lower part comprises:

a through opening configured to be aligned with the securing member and to receive the fastening member of the leg, wherein in use the end section of each engaging member extends at least to some extent downwards towards the respective internal side of the first and second furniture parts, and wherein in use the end section of the engaging members each engage an upper side of an internal edge profile of the internal sides of the first and second furniture parts;

wherein the upper part comprises a cavity disposed along each of the first side portion and the second side portion, each cavity is arranged in a bottom surface of the upper part at the engagement member of the first side portion and the second side portion; and wherein the lower part further includes a first side portion and a second side portion, the first side portion and the second side portion of the lower part each including a vertically extending projection, each vertically extending projection configured to fit within a corresponding one of each cavity of the upper part.

15. The bedframe according to claim 14, wherein the upper part further includes a rim that extends along an outer side of an upper surface that is provided without any engaging members, and wherein the rim extends downwards towards the lower part.

16. The bedframe according to claim 14, wherein:

the cavity respectively forms a bulge extending vertically from an upper surface of the upper part.

17. A method for connecting a leg with a first furniture part, and a second furniture part of a piece of furniture, using a corner bracket according to claim 1, said method comprising:

contacting an end section of an integrally formed engaging member provided on a first side portion of an upper part of the corner bracket with an upper side of an internal edge profile of an internal side of the first furniture part and contacting an end section of an integrally formed engaging member provided on a second side portion of an upper part of the corner bracket with an upper side of an internal edge profile of an internal side of the second furniture part such that each engaging member extends at least to some extent downwards towards the respective internal side of the first and second furniture parts;

aligning a lower part of the corner bracket with the upper part such that a through opening in the lower part is aligned with a securing member of the upper part;

inserting a fastening member of the leg through the through opening and into the securing member and engaging the fastening member with the securing member;

wherein the upper part comprises a cavity disposed along each of the first side portion and the second side portion, each cavity is arranged in a bottom surface of the upper part at the engagement member of the first side portion and the second side portion;

wherein the lower part further includes a first side portion and a second side portion, the first side portion and the second side portion of the lower part each including a vertically extending projection; and aligning the lower part of the corner bracket with the upper part includes fitting each vertically extending projection within a corresponding one of each cavity of the upper part.

18. The method according to claim 17, further comprising engaging a toothed end section forming a tilted end of an horizontally extending portion of the engaging member with the upper side of the internal edge profile of the internal side.

19. The method according to claim 17, wherein the step of inserting and engaging the fastening member further comprises mating at least one protrusion arranged on the lower part with at least one corresponding aperture extending into the bottom surface of the first or second furniture part, respectively.

20. The method according to claim 17, wherein:

the cavity respectively forms a bulge extending vertically from an upper surface of the upper part.

* * * * *